United States Patent Office 3,537,843
Patented Nov. 3, 1970

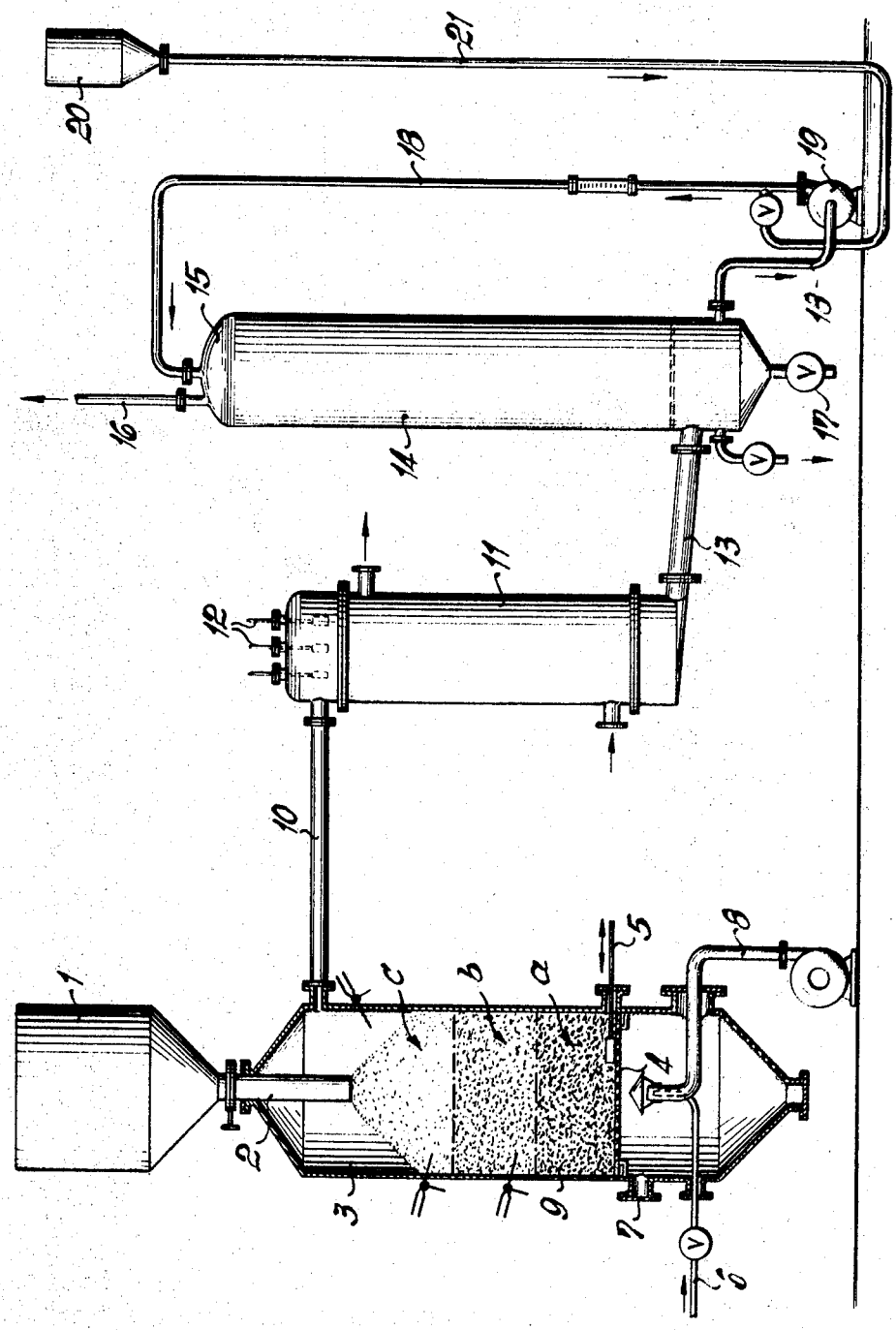

3,537,843
PROCESS FOR RECOVERING MERCURY FROM AN INACTIVE MERCURIC CHLORIDE/ACTIVE CARBON-CATALYST
Armin Jacobowsky, Knapsack, near Cologne, Germany, assignor to Knapsack Aktiengesellschaft, Knapsack, near Cologne, Germany, a corporation of Germany
Filed Apr. 2, 1968, Ser. No. 718,099
Claims priority, application Germany, Apr. 4, 1967, K 61,888
Int. Cl. C22b *43/00, 5/16;* B01j *11/04*
U.S. Cl. 75—81  3 Claims

ABSTRACT OF THE DISCLOSURE

Recovery of mercury from a contaminated inactive mercuric chloride/active carbon-catalyst comprising burning the active carbon with a deficiency of oxygen or air, expelling or subliming off, together with the combustion gases, a mixture of gaseous mercury, mercurous chloride and mercuric chloride, condensing the said gaseous mixture by cooling it, and, by adding a suitable reducing agent, reducing to mercury the mercurous chloride and mercuric chloride contained in the condensate.

---

It is known that vinyl chloride can be produced from acetylene and hydrogen chloride in contact with the active carbon-catalyst generally impregnated with 10% by weight mercuric chloride. The reaction of the components is initiated at a temperature of about 80° C. which, inside a contact furnace, increases to 120 to 150° C.—as a result of the exothermal reaction—and is maintained at that value by cooling. The fact that the mercury chloride is subject to sublimation gradually results in fatigue phenomena for the catalyst. These are even favored by the fact that the active carbon surface area becomes reduced by condensation and polymerization products that penetrate into the pores of the active carbon. The catalyst will often be found to be exhausted and inactive after an operation period of 8 to 15 months, depending on the catalyst load. Such exhausted catalyst still contains between about 2.2 and 5.8% by weight mercuric chloride. This depends on the operation period and reaction conditions. The inactive catalyst is required to be removed from the contact furnace and has previously been banked out in a prepared bed of lime. The step of rejecting a mercury catalyst is disadvantageous for reasons of economy and involves the danger of ground water poisoning.

The challenge has thus been to develop a process which enables this disadvantage to be obviated and the mercury to be recovered under reasonable conditions. Attempts made earlier with the object of recovering mercuric chloride from resinified active carbon by extraction with water or acetone, have been found to be unsatisfactory from economic aspects. The reason is that no more than 0.1 or 0.7% by weight of the mercury chloride contained in the catalyst is found to have dissolved after extraction for 1 hour with the use of water or acetone as the extractant. In laboratory tests, the extraction effect has also been found to decrease as the extraction period increases, whereas the rejected catalyst has been found to become extracted considerably more rapidly under outdoor conditions.

It has now been found that mercury in the form of a mixture comprising mercury, mercurous chloride and mercuric chloride can be recovered from inactive catalysts by burning the active carbon used as the catalyst carrier.

The present process for recovering mercury from an inactive contaminated mercuric chloride/active carbon-catalyst comprises more especially burning the active carbon with a deficiency of oxygen or air, expelling or subliming off, together with the combustion gases, a mixture consisting of gaseous mercury, mercurous chloride and mercuric chloride, condensing the said gaseous mixture by cooling it, the mercurous chloride or mercuric chloride contained in the resulting condensate being reduced to mercury by adding a suitable reducing agent.

In accordance with a further feature of the present invention the active carbon is burnt in contact with a deficiency of oxygen or air that ensures that the resulting combustion gases primarily contain carbon monoxide. The reason is that the carbon monoxide contained in the combustion gases entails partial reduction of the mercuric chloride to mercurous chloride and mercury.

For the exclusive recovery of mercury, it is necessary in accordance with the present invention to reduce the mercury compounds contained in the condensed combustion gases by means of a reducing agent known to be suitable for this. The useful reducing agents include, for example, hydrazine sulfate, ferrous sulfate or formaldehyde.

As compared with earlier methods, wherein the inactive catalyst is rejected, the process of the present invention offers two considerable advantages. These enable firstly the mercuric chloride contained in the catalyst to be recovered in the form of mercury and enable secondly the danger of ground water poisoning to be avoided. Needless to say this is a very desirable step forward in the art bearing in mind that more than 98.2% of the mercury initially contained in the catalyst is recovered and that the resulting off-gases as well as the minor amounts of slag are both free from mercury. The process of the present invention can be carried out, for example, with the apparatus shown diagrammatically in the accompanying drawing, which is operated in the manner described hereinafter.

Inactive catalyst placed in bunker 1 is allowed to travel via down pipe 2 into shaft furnace 3 provided with grate 4 and slag removing means 5. After ignition through ignition opening 7 of the fuel gas introduced into furnace 3 through line 6 and after access of some air through line 8, the catalyst 9, which is placed on grate 4, starts glowing. The supply of fuel gas is arrested and air for combustion is supplied at increased rates. The catalyst 9 burns on the grate and steadily sinks down, fresh catalyst being supplied through down pipe 2.

With respect to the combustion process, it is possible to subdivide shaft furnace 3 into three zones comprising a combustion zone *a*, a sublimation zone *b* and a drying zone *c*. The combustion gases coming from combustion zone *a*, in which the mercuric chloride is partially reduced to mercurous chloride and mercury, travel through sublimation zone *b* and produce partial sublimation of the mercuric chloride contained in the catalyst.

In drying zone *c*, the burnt catalyst is freed from water and further volatile constituents.

The combustion gases produced on burning the catalyst, which leave shaft furnace 3 through line 10, are supplied to tube condenser 11 to be cooled therein. The combustion gases contain carbon monoxide, carbon dioxide, nitrogen, mercuric chloride and mercurous chloride as well as mercury in vapor form. Both the mercury in vapor form and the mercury chlorides precipitate on the tubes and accumulate in the bottom portion of condenser 11. Condensed material depositing on the walls of condenser 11, if any, is removed from time to time by means of scraper 12. The condensates accumulating in the bottom portion of condenser 11 are supplied together with the combustion gases through line 13 to scrubbing tower 14 charged overhead with a reducing scrubbing solution 15. In the scrubbing solution accumulating in the bottom portion of scrubbing tower 14, the mercury chlorides are reduced to mercury, which is withdrawn through outlet opening 17. The combustion gases which ascend in scrubbing tower 14 also contain mercury chloride contaminants. These are also scrubbed out and reduced to mercury. The purified combustion gases leave scrubbing tower 14 through line 16 and are burnt. The scrubbing solution is recycled through line 18 to scrubbing tower 14, preferably by means of pump 19. Consumed scrubbing liquid can be replaced with fresh scrubbing solution, which is stored in container 20, and is introduced through line 21 into the cycled scrubbing solution.

I claim:

1. A process for recovering mercury from a contaminated inactive mercuric chloride/active carbon-catalyst, which comprises burning the active carbon with a deficiency of oxygen or air, expelling or subliming off, together with resulting combustion gases, a mixture consisting of gaseous mercury, mercurous chloride and mercuric chloride, condensing the said gaseous mixture by cooling it, the mercurous chloride and mercuric chloride contained in the resulting condensate being reduced to mercury by adding a suitable reducing agent.

2. The process of claim 1, wherein the active carbon is burnt in the presence of a deficiency of oxygen or air to produce predominantly carbon monoxide.

3. The process of claim 1, wherein the reducing agent is a member selected from the group consisting of hydrazine sulfate, ferrous sulfate and formaldehyde.

References Cited

UNITED STATES PATENTS

| | | | |
|---|---|---|---|
| 1,084,346 | 1/1914 | Kaufler et al. | 23—87 |
| 1,185,499 | 5/1916 | Grunstein | 75—81 |
| 1,312,743 | 8/1919 | Moeys | 23—87 |
| 2,456,935 | 12/1948 | Fisher | 75—81 |

FOREIGN PATENTS

| | | |
|---|---|---|
| 373,368 | 4/1923 | Germany. |
| 529,427 | 9/1921 | France. |

HENRY W. TARRING II, Primary Examiner

U.S. Cl. X.R.

23—87; 252—411